United States Patent
Bjorke

(10) Patent No.: US 8,115,775 B1
(45) Date of Patent: Feb. 14, 2012

(54) SYSTEM, METHOD, AND COMPUTER PROGRAM PRODUCT FOR ENCODING INFORMATION IN TEXTURE MAPS TO ENHANCE TEXTURING

(75) Inventor: Kevin Bjorke, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 734 days.

(21) Appl. No.: 11/837,230

(22) Filed: Aug. 10, 2007

(51) Int. Cl.
*G09G 5/00* (2006.01)

(52) U.S. Cl. ........ 345/582; 345/552; 345/586; 345/587; 382/232; 382/283; 380/205; 713/190

(58) Field of Classification Search .................. None
See application file for complete search history.

(56) References Cited

U.S. PATENT DOCUMENTS

| | | | | |
|---|---|---|---|---|
| 5,255,360 | A * | 10/1993 | Peaslee et al. | 345/552 |
| 6,819,793 | B1 * | 11/2004 | Reshetov et al. | 382/166 |
| 6,895,101 | B2 * | 5/2005 | Celik et al. | 382/100 |
| 7,369,515 | B2 * | 5/2008 | Salesky et al. | 370/260 |
| 7,532,740 | B2 * | 5/2009 | Levy | 382/100 |
| 7,643,032 | B2 * | 1/2010 | Wetzel et al. | 345/582 |
| 7,885,470 | B2 * | 2/2011 | Shi et al. | 382/232 |

OTHER PUBLICATIONS

Garcia et al., "Texture-Based Watermarking of 3D Video Objects."

* cited by examiner

*Primary Examiner* — Antonio A Caschera
(74) *Attorney, Agent, or Firm* — Zilka-Kotab, PC

(57) ABSTRACT

A method comprises encoding information in a texture map, and enhancing texturing utilizing the information, where the information identifies at least one region in at least one texture. Additionally, a texture data structure is embodied on a non-transitory computer readable medium and comprises a texture map with encoded information that identifies at least one region in at least one texture. In addition, an apparatus comprises a processor for encoding information in a texture map to enhance texturing, where the information identifies at least one region in at least one texture.

25 Claims, 7 Drawing Sheets

SYSTEM, METHOD, AND COMPUTER PROGRAM PRODUCT FOR ENCODING INFORMATION IN TEXTURE MAPS TO ENHANCE TEXTURING

FIELD OF THE INVENTION

The present invention relates to graphics processing, and more particularly to texturing.

BACKGROUND

Developers of games and other visual applications typically desire to incorporate a maximum number of advanced graphics features, in order to optimize a user's experience. However, it is often unknown as to what type of platform such applications will run and whether they will support such advanced graphics features. Thus, such developers are often faced with the tradeoff of not incorporating, the aforementioned advanced graphics features so that an application will run on a low-end system, or including the same and miming the risk that such low-end systems will exhibit difficulty in supporting such features.

There is thus a need for addressing these and/or other issues associated with the prior art.

SUMMARY

A texture map encoding system, method, and computer program product are provided. In use, information is encoded in a texture map. In use, texturing is enhanced utilizing the information.

DETAILED DESCRIPTION

Figure 1:
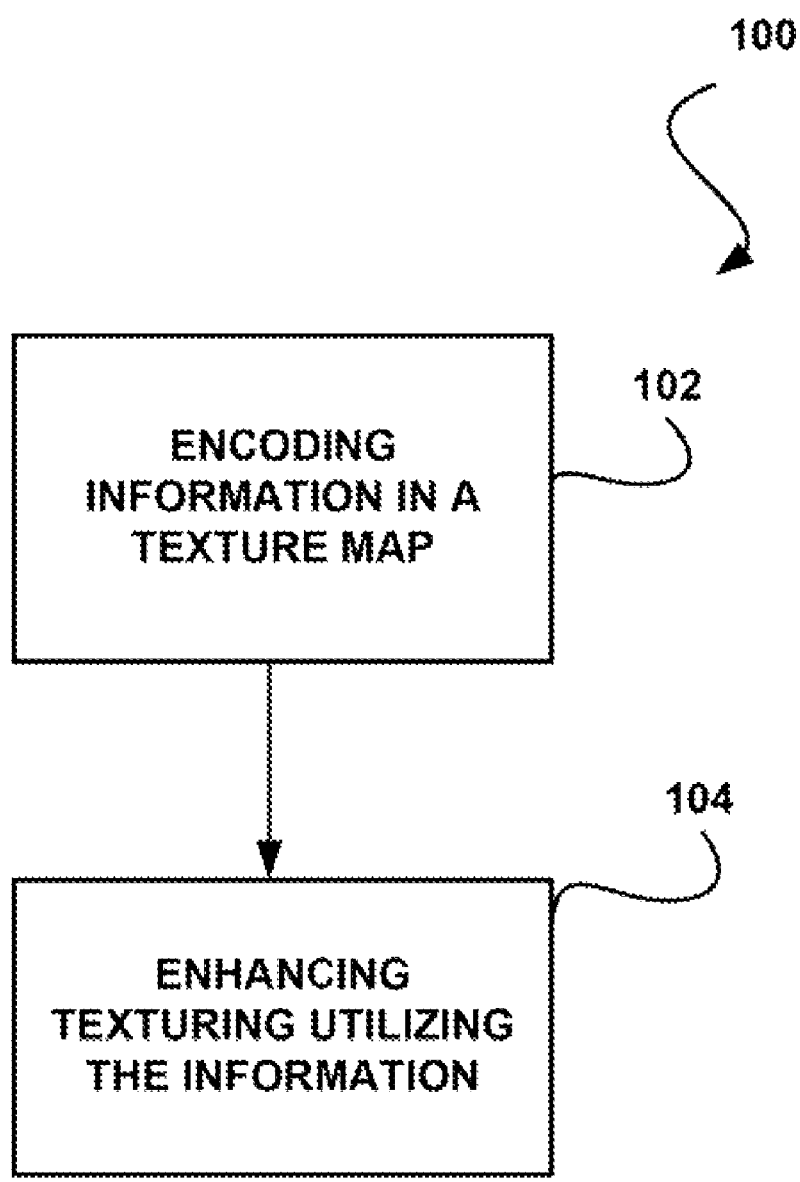
FIG. 1 shows a method for encoding information in a texture map, in accordance with one embodiment.

FIG. 1 shows a method 100 for encoding information in a texture map, in accordance with one embodiment. In the context of the present description, the texture map may include any image that is capable of being used for texturing. Such image may, in one embodiment, include a two-dimensional image including any desired surface characteristics including, but not limited to color, transparency, texture, shadows, reflectance, etc.

Further, texturing may refer to any operation that involves use of a texture map for applying any desired surface characteristic(s) to an object to be rendered. In one embodiment, the texturing may include two-dimensional texturing. In another embodiment, the texturing may include three-dimensional texturing.

As shown in FIG. 1, information is encoded in the texture map. See operation 102. In the context of the present description, such encoding may refer to any encoding process capable of incorporating; such information with the texture map. Just by way of example, the encoding may include steganographic encoding. In one embodiment, such steganographic encoding may involve hiding the information in a least significant bit (LSB) of a corresponding channel (e.g. color channel, alpha channel, etc.). Of course, other encoding, is contemplated insofar as it meets the abovementioned definition.

Still yet, the foregoing information may refer to absolutely any data that is capable of being used to enhance texturing. Just by way of example, such information may include one or more masks. In the present description, such mask may identify at least one region in at least one texture. Such region may, for instance, be identified for the purpose of tailoring texturing in such region. In the context of an embodiment where the coding includes a LSB encoding, such mask may include an LSB mask. In one embodiment, the mask may include a one-bit mask. Of course, other embodiments may include two-bit, three-bit, etc. masks.

With continuing reference to FIG. 1, texturing may be enhanced utilizing the encoded information. See operation 104. In the context of the present description, such enhancement may involve improvement to any aspect of the texturing. For example, in one embodiment where the information includes a mask identifying one or more regions of a texture that are to convey a predetermined characteristic (e.g. a metallic characteristic, transparency, reflectance, heat dissipation, etc.), such enhancement may involve applying such predetermined characteristic to the appropriate region(s). Of course, any texturing enhancement may be provided that utilizes, at least in part, the aforementioned information.

By this design, the information encoded in operation 102 may or may not be used for any desired texturing enhancement in operation 104, in various embodiments. For example, if the texture map is being utilized by a low-end system (e.g. a system with insufficient resources, etc.), such low-end, system may simply ignore the encoded information and thus do without any supported texturing enhancement. On the other hand, if the texture map is being utilized by a high-end system (e.g. a system with sufficient resources, etc.), such high-end system may extract the encoded information (e.g. decode the same, etc.) and thereby perform the texturing enhancement. In either case, the number of texture maps need not necessarily be increased to accommodate the information, since it may be encoded in a texture map with other information.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
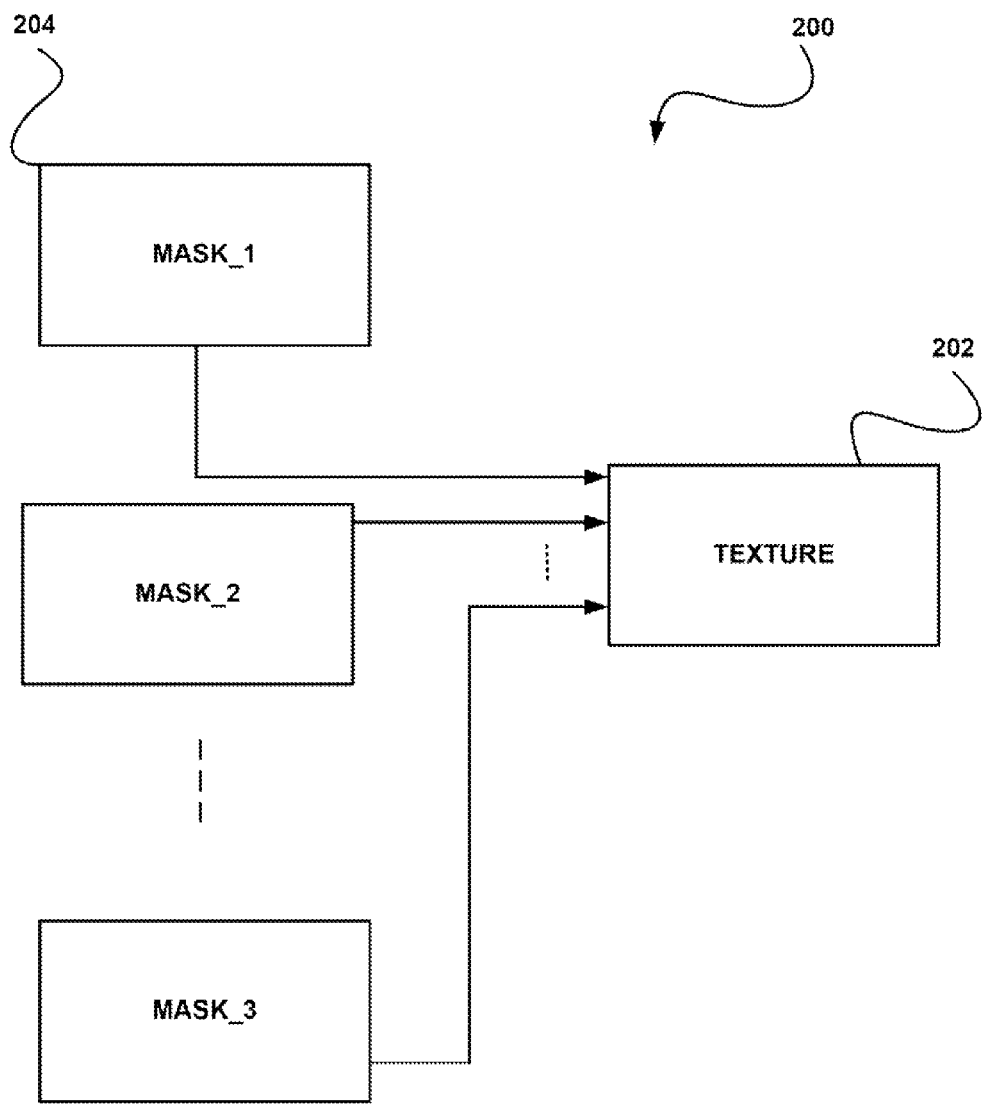
FIG. 2 shows a system for encoding one or more masks in a texture, in accordance with one embodiment.

FIG. 2 shows a system 200 for encoding one or more masks in a texture, in accordance with one embodiment. As an option, the present system 200 may be implemented in the context of the method 100 of FIG. 1. Of course, however, the system 200 may be implemented in any desired environment. It should also be noted that the aforementioned definitions may apply during, the present description.

As shown, one or more masks 204 are each encoded in a single texture 202. To this end, what would possibly otherwise require more than one texture 202 to store such mask(s) 204 requires a few number of such textures 202 (e.g. a single texture, etc.). While a single texture 202 is shown in FIG. 2, it should be noted that any number of textures 202 may be provided.

In one embodiment, such one or more masks 204 may not necessarily be visible to the naked eye (i.e. substantially invisible, etc.). More information will now be set forth regarding one exemplary way in which such encoding may take place.

Figure 3:
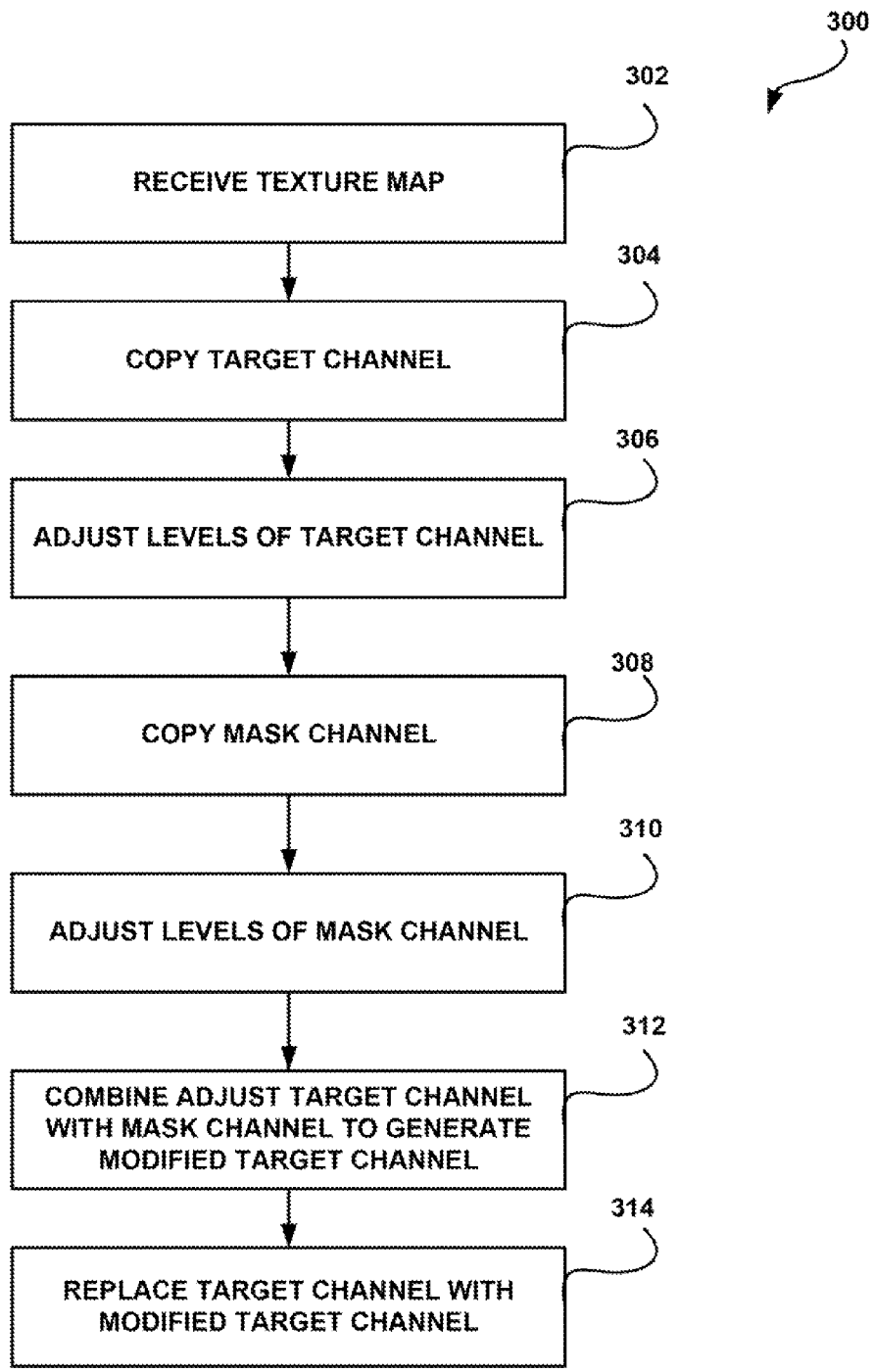
FIG. 3 shows a method for encoding information in a texture map, in accordance with another embodiment.

FIG. 3 shows a method 300 for encoding information in a texture map, in accordance with another embodiment. As an option, the present method 300 may be implemented in the context of the functionality and architecture of FIGS. 1-2. For example, the method 300 may or may not be used in the context of operation 102 of FIG. 1. Of course, however, the method 300 may be carried out in any desired environment. Again, the aforementioned definitions may apply during the present description.

As shown, a texture map is received. Note operation 302. As will soon become apparent, the present method 300 serves to encode mask channel information in already-existing channel information of such texture map.

Figure 4A:
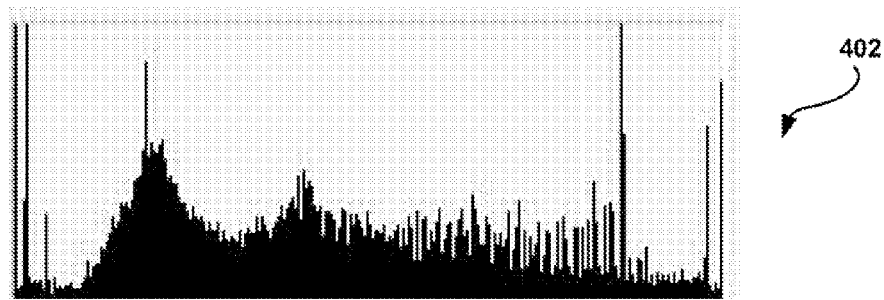
FIGS. 4A-F show various channel information during different stages of the method of FIG. 3, in accordance with another embodiment.

To accomplish this, target channel information from the texture map may be copied, as indicated in operation 304. Such target channel information may include any desired channel (e.g. red, green, blue, alpha, etc. channel). For example, the red channel information may include all red color data stored in association with the texture map. FIG. 4A illustrates an exemplary target channel 402. Further, such information may be copied in any desired memory which may or may not be the memory in which the texture map resides.

Next, in operation 306, the levels of the target channel are adjusted. Specifically, a granularity of such information may be reduced. For example, a span of the target channel may be "halved" (or reduced less/further). Thereafter, such target channel may be expanded. To this end, the target channel includes only a portion of the original values (e.g. just even/odd values or some other subset, etc.).

Table 1 illustrates an exemplary level adjustment in association with the target channel. Of course, such adjustment is set forth for illustrative purposes only and should not be construed as limiting in any manner whatsoever.

TABLE 1

| |
|---|
| 1-255 → 0-127 |
| 0-127 → 0-254 |

Figure 4B:
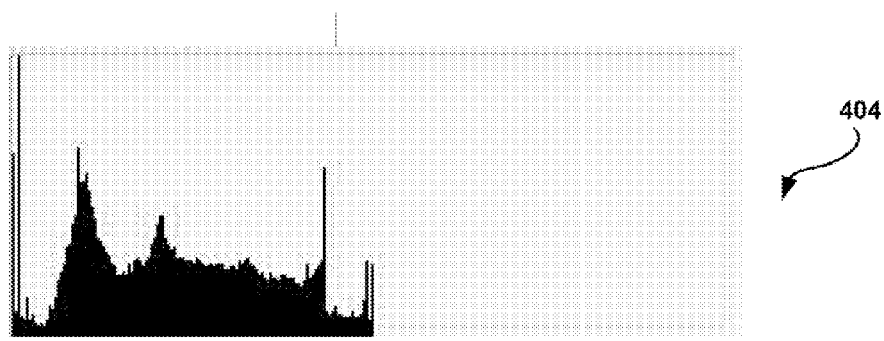
Figure 4C:
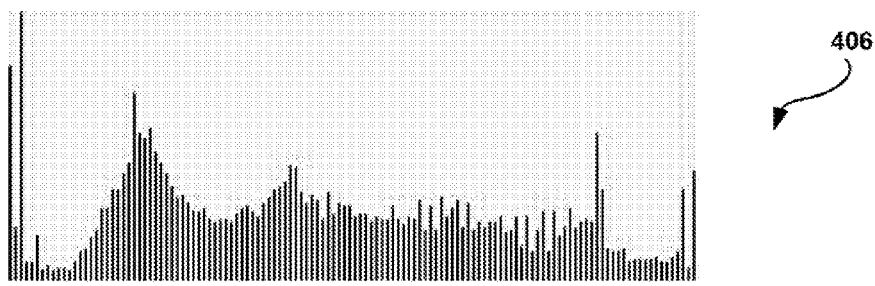
Figure 4D:
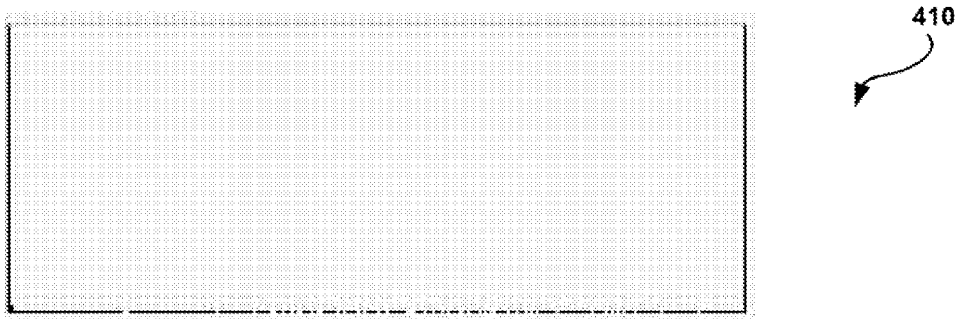

For example, FIG. 4B illustrates the target channel 404 subjected to the first level adjustment, while FIG. 4C illustrates the target channel 406 subjected to the subsequent level adjustment. To this end, a "spiky" histogram results. To this end, a fewer number of bits may be used to store the same information. For example, even-valued bits may be used to store information relevant to pixels associated with the missing odd-valued bits.

With continuing reference to FIG. 3, mask channel information may also be copied, as indicated in operation 308. Such mask channel information may include any desired information that may be used to enhance texturing. FIG. 41) illustrates an exemplary mask channel 410. Similar to the target channel information, the present information may be copied in any desired memory which may or may not be the memory in which the texture map resides.

Next, in operation 310, the levels of the mask channel are adjusted. Table 2 illustrates an exemplary level adjustment in association with the mask channel. Of course, such adjustment is set forth for illustrative purposes only and should not be construed as limiting in any manner whatsoever.

TABLE 2

| |
|---|
| 1-255 → 0-1 |

Figure 4E:
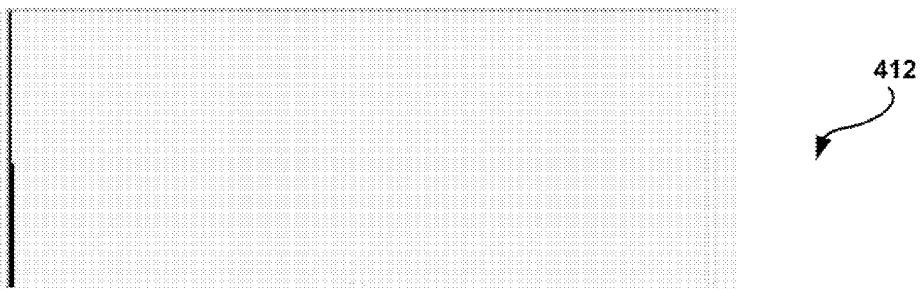

FIG. 4E illustrates the mask channel 412 subjected to the foregoing level adjustment. While it looks black, it should be noted that data exists at level=1.

Figure 4F:
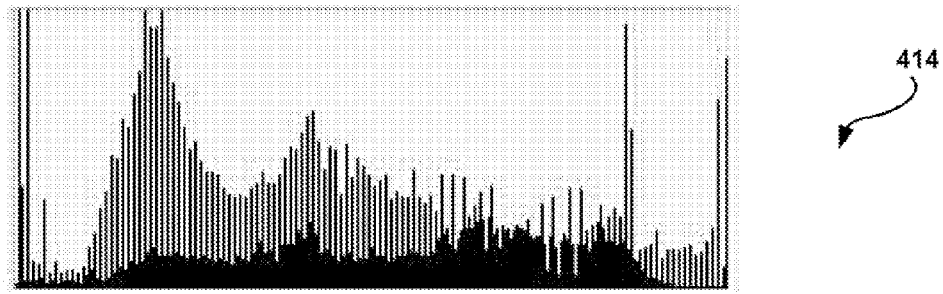

Next, in operation 312, the adjusted target channel is combined with the mask channel to generate a modified target channel. FIG. 4F illustrates the modified target channel 414. Such modified target channel thus includes the mask channel information encoded therein. Further, in operation 314, the target channel is replaced with the modified target channel. While the foregoing operations may be performed using any desired mechanism, one embodiment is contemplated whereby the foregoing encoding is carried out using Adobe® Photoshop®.

While not shown, any associated mipmap may be generated before the foregoing encoding of method 300. This may be done to avoid a situation where filtered (e.g. interpolated) downsampling may negatively impact the extracted values. While larger files may thereby exist, enhanced quality may also be provided.

In another embodiment, a mipmap may be generated for color information, and a separate mipmap may be generated for the mask information. As an option, such separate mipmaps may be generated using any desired tool such as the NVIDIA® Mipster® tool. To this end, the mask mipmap may be flattened in the manner set forth above and added as a new channel to flattened color mipmaps, etc.

Figure 5:
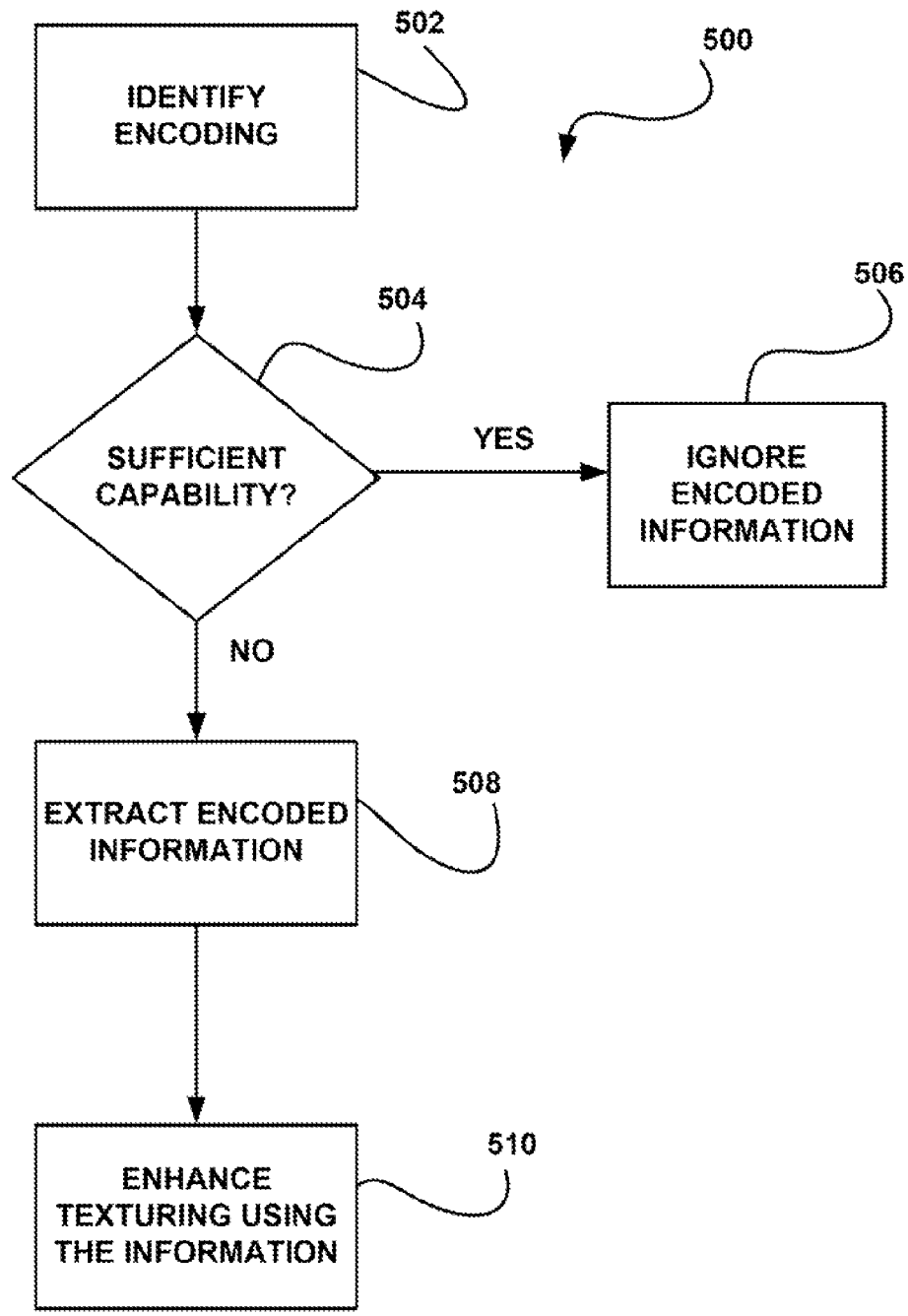
FIG. 5 shows a method for utilizing encoded information in a texture map to enhance texturing, in accordance with another embodiment.

FIG. 5 shows a method 500 for utilizing encoded information in a texture map to enhance texturing, in accordance with another embodiment. As an option, the present method 500 may be implemented in the context of the functionality and architecture of FIGS. 1-4. For example, the method 500 ma or may not be used to use the encoded information encoded in operation 102 of FIG. 1, and FIG. 3. Of course, however, the method 500 may be carried out in any desired environment. Again, the aforementioned definitions may apply during the present description.

As shown, the existence of any encoding may be ascertained, by simply inspecting each channel (e.g., for characteristics shown in FIG. 4F, etc). See operation 502. Strictly as an option, a header of a texture map may be inspected to determine whether any encoded information is included. In one embodiment, such header may include a bit for indicating the same. Other embodiments, however, are contemplated where a more complex data structure is used to indicate the type of encoding, the information that is encoded, etc.

Next, it is determined whether a system utilizing the texture map for texturing includes sufficient capabilities to use the encoded information. See decision 504. In one embodiment, this may be accomplished by identifying system specifications (e.g. hardware specifications, etc.). It should be noted that the system may or may not have sufficient capabilities based on any desired criteria that is relevant to whether such system can effectively utilize information encoded in the texture map to enhance texturing. For example, a performance threshold may be determinative of whether the system is equipped for use of the encoded information. Still yet, such criteria may be different for different information encoded in different texture maps. Further, in various embodiments, the decision 504 may be determined by any entity (e.g. a driver, the hardware itself, etc.).

To this end, the texturing may be conditionally enhanced utilizing the information, based on the decision 504. Specifically, the texturing may not necessarily be enhanced utilizing the information, if the system specifications indicate that a capability is below a predetermined threshold. In such case, the encoded information may be simply ignored. See operation 506.

On the other hand, the texturing may be enhanced utilizing the information, if the system specifications indicate that a capability exceeds a predetermined threshold. In such case, the encoded information may be extracted. Note operation 508. It should be noted that the encoded information may be extracted using any desired mechanism (e.g. a decoder, etc.).

Table 3 illustrates illustrative code for extracting the encoded information. Of course, such exemplary code is set forth for illustrative purposes only and should not be construed as limiting in any manner whatsoever.

TABLE 3

```
float4 C = tex2D(colorMap,uvCoordinates);
int r255 = (int)(C.r * 255.0);
int rc = (r255-1)/2;
int r254 = rc*2;
float mask = (float)(r255-r254);
```

To this end, the extracted information may be used to enhance texturing. Note operation 510.

In embodiments involving a graphics processor with the ability to utilize multiple samplers on a single texture, various techniques may be used to more effectively extract and use the encoded information. For example, a first sampler may be used to point sample the mask channel information, while one or more other filter samplers may be used to perform other tasks (e.g. processing the color channel information, etc.).

Figure 6:
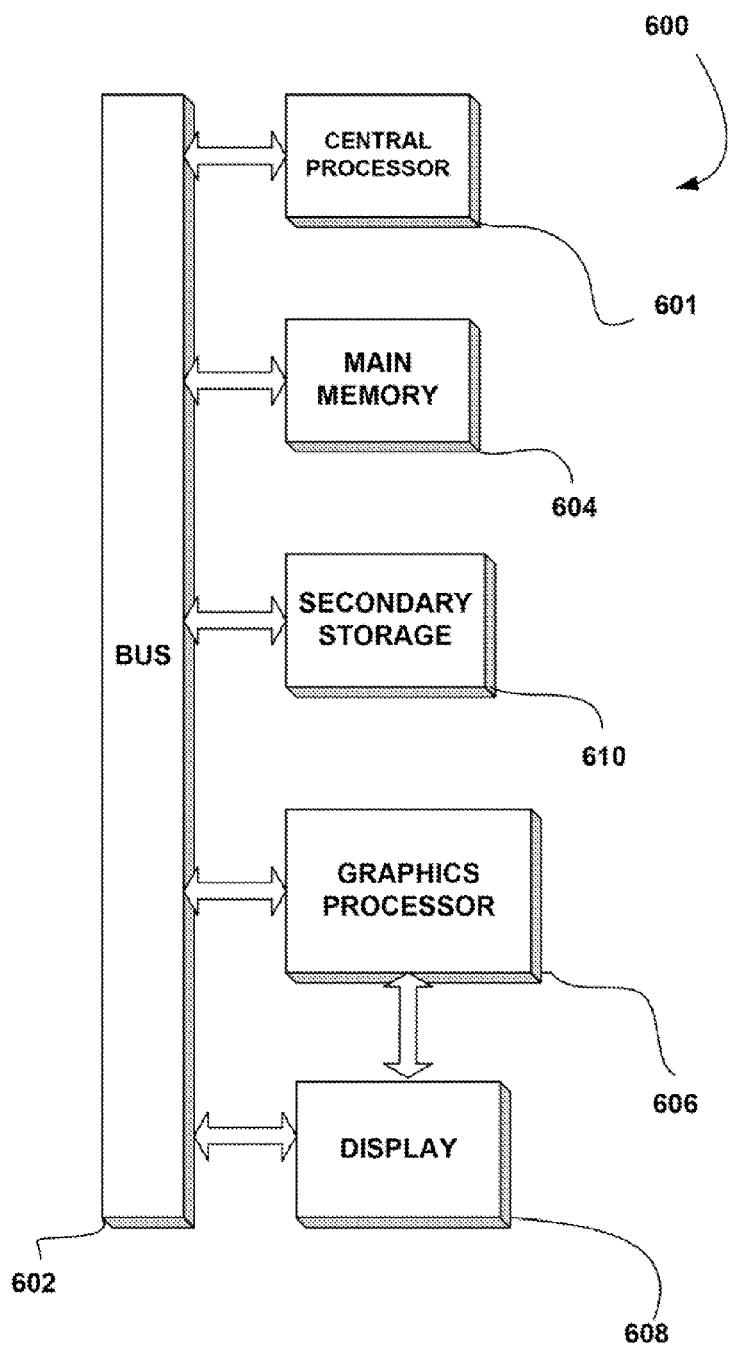
FIG. 6 illustrates an exemplary system in which the various architecture and/or functionality of the various previous embodiments may be implemented.

FIG. 6 illustrates an exemplary system 600 in which the various architecture and/or functionality of the various previous embodiments ma be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing, a floppy disk drive, a magnetic tape drive, a compact disk drive, etc. the removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606 an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit hoard system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices in including, but not limited to a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described, above, it should be understood that they have been presented by way of example only, and not limitation. Thus, the breadth and scope of a preferred embodiment should not be limited by an of the above-described exemplary embodiments, but should be defined only in accordance with the following claims and their equivalents.

What is claimed is:

1. A method, comprising:
encoding information in a texture map, utilizing a processor, the encoding including adjusting levels of a first channel and a second channel and combining the first channel and the second channel; and
enhancing texturing utilizing the information;
wherein the information identifies at least one region in at least one texture;
wherein the encoding includes steganographic encoding.

2. The method of claim 1, wherein the information includes a mask.

3. The method of claim 2, wherein the mask includes a least significant bit (LSB) mask.

4. The method of claim 1, wherein the texturing includes two-dimensional texturing.

5. The method of claim 1, wherein the texturing includes three-dimensional texturing.

6. The method of claim 1, wherein a first mipmap is generated for the information and a second mipmap is generated for other information in the texture map.

7. The method of claim 1, wherein an associated mipmap is generated before the encoding.

8. The method of claim 1, and further comprising identifying system specifications.

9. The method of claim 8, wherein the system specifications includes hardware specifications.

10. The method of claim 8, and further comprising conditionally enhancing the texturing utilizing the information, based on the system specifications.

11. The method of claim 10, wherein the texturing is not enhanced utilizing the information, if the system specifications indicate that a capability of a system is insufficient.

12. The method of claim 10, wherein the texturing is enhanced utilizing the information, if the system specifications indicate that a capability of a system is sufficient.

13. The method of claim 1, wherein the information includes at least one mask that identifies the at least one region in the at least one texture for tailoring texturing in the at least one region.

14. The method of claim 1, wherein the information includes at least one mask that identifies the at least one region in the at least one texture that conveys a predetermined characteristic, and the enhancing includes applying the predetermined characteristic to the at least one region in the at least one texture.

15. The method of claim 1, wherein the steganographic encoding includes hiding the information in a least significant bit (LSB) of a channel.

16. The method of claim 15, wherein the channel includes color channel.

17. A method, comprising:
   encoding information in a texture map, utilizing a processor; and
   enhancing texturing utilizing the information;
   wherein the information identifies at least one region in at least one texture;
   wherein the encoding includes steganographic encoding;
   wherein a first sampler is used to point sample the information, and one or more other samplers are used to filter sample other information in the texture map.

18. A texture data structure embodied on a non-transitory computer readable medium, comprising:
   a texture map with encoded information, the encoded information including adjusted levels of a first channel and a second channel and a combination of the first channel and the second channel;
   wherein the encoded information identifies at least one region in at least one texture;
   wherein the encoded information includes steganographic encoded information.

19. An apparatus, comprising:
   a processor for encoding information in a texture map to enhance texturing encoding including adjusting levels of a first channel and a second channel and combining the first channel and the second channel;
   wherein the information identifies at least one region in at least one texture;
   wherein the encoding includes steganographic encoding.

20. The apparatus of claim 19, wherein the processor remains in communication with memory and a display via a bus.

21. A method, comprising:
   encoding information in a texture map, utilizing a processor; and
   enhancing texturing utilizing the information;
   wherein the information identifies at least one region in at least one texture;
   wherein the encoding includes steganographic encoding, the steganographic encoding including hiding the information in a least significant bit (LSB) of a channel;
   wherein the channel includes an alpha channel.

22. A texture data structure embodied on a non-transitory computer readable medium, comprising:
   a texture map with encoded information;
   wherein the encoded information identifies at least one region in at least one texture;
   wherein the encoded information includes steganographic encoded information;
   wherein a first sampler is used to point sample the information, and one or more other samplers are used to filter sample other information in the texture map.

23. An apparatus, comprising:
   a processor for encoding information in a texture map to enhance texturing;
   wherein the information identifies at least one region in at least one texture;
   wherein the encoding includes steganographic encoding;
   wherein a first sampler is used to point sample the information, and one or other samplers are used to filter sample other information in the texture map.

24. A texture data structure embodied on a non-transitory computer readable medium, comprising:
   a texture map with encoded information;
   wherein the encoded information identifies at least one region in at least one texture;
   wherein the encoded information includes steganographic encoded information, the steganographic encoded information including the information hidden in a least significant bit (LSB) of a channel;
   wherein the channel includes an alpha channel.

25. An apparatus, comprising:
   a processor for encoding information in a texture map to enhance texturing;
   wherein the information identifies at least one region in at least one texture;
   wherein the encoding includes steganographic encoding, the steganographic encoding including hiding the information in a least significant bit (LSB) of a channel;
   wherein the channel includes an alpha channel.

* * * * *

UNITED STATES PATENT AND TRADEMARK OFFICE
CERTIFICATE OF CORRECTION

| | |
|---|---|
| PATENT NO. | : 8,115,775 B1 |
| APPLICATION NO. | : 11/837230 |
| DATED | : February 14, 2012 |
| INVENTOR(S) | : Kevin Bjorke |

Page 1 of 1

It is certified that error appears in the above-identified patent and that said Letters Patent is hereby corrected as shown below:

In the claims:

Col. 7, claim 16, line 20; please insert --a-- after "includes";

Col. 7, claim 19, line 44; please replace "texturing encoding" with --texturing, the encoding--;

Col. 8, claim 23, line 31; please insert --more-- after "or" and before "other".

Signed and Sealed this
Fifth Day of June, 2012

David J. Kappos
*Director of the United States Patent and Trademark Office*